United States Patent
Xiong et al.

(10) Patent No.: US 10,727,665 B2
(45) Date of Patent: Jul. 28, 2020

(54) SHORT-CIRCUIT PROTECTION APPARATUS AND METHOD

(71) Applicant: AutoChips Inc., Hefei (CN)

(72) Inventors: Xianfeng Xiong, Hefei (CN); Zhenghua Song, Hefei (CN); Jiyong Lin, Hefei (CN)

(73) Assignee: AUTOCHIPS INC., Hefei (CN)

( * ) Notice: Subject to any disclaimer, the term of this patent is extended or adjusted under 35 U.S.C. 154(b) by 316 days.

(21) Appl. No.: 15/997,713

(22) Filed: Jun. 5, 2018

(65) Prior Publication Data
US 2019/0199087 A1 Jun. 27, 2019

(30) Foreign Application Priority Data
Dec. 22, 2017 (CN) .......................... 2017 1 1416502

(51) Int. Cl.
*H02H 7/20* (2006.01)
*H02H 3/08* (2006.01)
*H02H 3/02* (2006.01)
*H02H 3/20* (2006.01)
*H02H 1/00* (2006.01)

(52) U.S. Cl.
CPC .......... *H02H 7/205* (2013.01); *H02H 1/0007* (2013.01); *H02H 1/0053* (2013.01); *H02H 3/023* (2013.01); *H02H 3/08* (2013.01); *H02H 3/20* (2013.01)

(58) Field of Classification Search
CPC ............ H02H 3/023; H02H 3/08; H02H 3/20; H02H 7/205

USPC .......... 323/277; 361/56, 57, 79, 86–88, 93.1
See application file for complete search history.

(56) References Cited

U.S. PATENT DOCUMENTS

| 7,550,955 | B2* | 6/2009 | Agari | G05F 1/575 323/268 |
|---|---|---|---|---|
| 2007/0108949 | A1 | 5/2007 | Ohoka | |
| 2008/0151454 | A1* | 6/2008 | Uhl | B60R 21/017 361/87 |
| 2010/0259856 | A1* | 10/2010 | Senriuchi | H02J 7/0031 361/49 |
| 2012/0126791 | A1* | 5/2012 | Nakatake | H02H 3/08 324/123 R |
| 2013/0114167 | A1 | 5/2013 | Kin et al. | |
| 2014/0022680 | A1* | 1/2014 | Berggren | H02H 7/268 361/79 |

(Continued)

FOREIGN PATENT DOCUMENTS

CN 203590570 U 5/2014

*Primary Examiner* — Gary A Nash

(57) ABSTRACT

The present disclosure provides a short-circuit protection apparatus and method. The short-circuit protection apparatus includes a current detection circuit, a control circuit, and a voltage detection circuit. The current detection circuit detects an output current of an output circuit and outputs a current detection signal when the detected current is greater than a preset current. The control circuit receives the current detection signal and controls the output circuit to be turned off The voltage detection circuit detects an output voltage of the output circuit. When the output voltage is not in the preset voltage range, the output voltage is detected continuously When the output voltage is in the preset voltage range, the control circuit receives the voltage detection signal for controlling the output circuit.

14 Claims, 3 Drawing Sheets

(56) References Cited

U.S. PATENT DOCUMENTS

| | | | |
|---|---|---|---|
| 2014/0268458 A1* | 9/2014 | Luciani | H02H 3/10 361/86 |
| 2015/0138680 A1* | 5/2015 | Souma | H03K 17/0822 361/87 |
| 2015/0138681 A1* | 5/2015 | Mayes | H02H 3/08 361/93.7 |
| 2015/0155700 A1* | 6/2015 | Alvarez Valenzuela | H03K 17/0822 361/93.9 |
| 2015/0162819 A1* | 6/2015 | Nguyen | H03K 17/0822 363/50 |

* cited by examiner

SHORT-CIRCUIT PROTECTION APPARATUS AND METHOD

CROSS-REFERENCE TO RELATED APPLICATIONS

The present application claims all benefits accruing under 35 U.S.C. § 119 from China Patent Application No. 201711416502.2, filed on Dec. 22, 2017 in the China Intellectual Property Office, the disclosure of which is incorporated herein by reference. This application is related to application entitled "short-circuit protection apparatus and method", filed on Apr. 19, 2018 Ser. No. 15/956,767.

TECHNICAL FIELD

The described embodiments relate to protection apparatuses and method, and in particular to a short-circuit protection apparatus and method.

BACKGROUND

Currently, audio power amplifiers have high output power and high output current, it is easy to burn out when large current flows transistors of the power amplifier for a long time, especially when short-circuit status occurs. In the course of using, the output of power amplifier may be shorted to power supply line, ground wire, and loads due to improper operation. Using a single short-circuit protection method, the power amplifier may he power-on or power-off alternately or shocked by large current repeatedly, reducing its life and reliability. At present, there are three main short-circuit protection methods for power amplifier: 1) self-locking short-circuit protection is to lock the power amplifier after the power amplifier has short-circuit status, and the power amplifier does not output. The power amplifier does not return to operation even after the short-circuit fault is eliminated. The power amplifier can return to operation when it is restarted. 2) continuous short-circuit protection is to continuously detect the output of the power amplifier after the power amplifier has short-circuit status, and control the transistors of the power amplifier to be turned on or off according to the detection result. The power amplifier can return to operate after the short-circuit fault is eliminated. 3) blanking self-locking short-circuit protection is to detect the output of power amplifier after the power amplifier has short-circuit status, and control the transistors of the power amplifier to be turned on or off repeatedly according to the detection result, at the same time, it calculate the number of short-circuit or short circuit time. When the number of short-circuit or short circuit time is larger than a preset value, the power amplifier does not output, to avoid shocking the transistors of the power amplifier and prevent the power amplifier from being turned off by mistake triggering of the short-circuit.

However, there are different disadvantages in the three methods, such as self-locking short-circuit protection can return to operate through restarting after the power amplifier has short-circuit status. This method cannot avoid shutting the power amplifier by instantaneous short-circuit caused by human error. The continuous short-circuit protection can avoid shutting the power amplifier by instantaneous short-circuit caused by human error. The power amplifier can return to operate after the short-circuit fault is eliminated. However, this method makes the transistors of the power amplifier in an over-current status or protection status, which will adversely affect life and reliability of the power amplifier. The blanking self-locking short-circuit protection can prevent the transistors of the power amplifier from being over-current, but the protection behavior is single in different situations, such as the output of the power amplifier has short-circuit status with the power supply line, the ground wire, or the loads. When the short-circuit status occurs, the power amplifier are locked after the large current reaches a preset value in a preset time, and then, the power amplifier can return to operate through restarting.

SUMMARY

The main technology issue to be solved in the disclosure is to provide a short-circuit protection apparatus and method, to reduce the number of restart and avoid current shocking the power amplifier after the power amplifier has short-circuit status.

In order to solve the above-mentioned main technology issue, one approach of the present disclosure is to provide a short-circuit protection apparatus, comprising:

a current detection circuit, corrected to an output circuit to detect an output current of the output circuit and output a current detection signal when the output current is Greater than a preset current;

a control circuit, connected to the current detection circuit to receive the current detection signal and control the output circuit to be in a turned-off state according to the current detection signal;

a voltage detection circuit, connected to the output circuit and the control circuit to detect an output voltage of the output circuit, wherein when the output voltage is not in a preset voltage range, the voltage detection circuit is set to continuously detect the output voltage; and when the output voltage is in the preset voltage range, the voltage detection circuit outputs a voltage detection signal to the control circuit for controlling the output circuit according to the voltage detection signal.

In order to solve the above-mentioned main technology issue, another approach of the present disclosure is to provide a short-circuit protection method, comprising:

detecting an output current of an output circuit through a current detection circuit, wherein the current detection circuit is connected to the output circuit.

outputting a current detection signal from the Current detection circuit when detecting the output current of the output circuit is greater than a preset current.

receiving the current detection signal and controlling the output circuit to be in a turned-off state through the control circuit according to the current detection signal, wherein the control circuit is connected to the current detection circuit.

detecting an output voltage of the output circuit through a voltage detection circuit and determining whether the output voltage is or not in a preset voltage range, wherein the voltage detection circuit is connected to the output circuit and the control circuit, when the output voltage is not in a preset voltage range, the voltage detection circuit is set to continuously detect the output voltage; and when the output voltage is in the preset voltage range, the voltage detection circuit outputs a voltage detection signal to the control circuit for controlling the output circuit according to the voltage detection signal.

The present disclosure has the following advantages: different from the prior art, the short-circuit protection apparatus and method of the present disclosure differentiate a current detection circuit detects an output current of the output circuit and controls the output circuit to be turned off when the output current is greater than a preset current. The voltage detection circuit detects an output voltage of the output circuit. When the output voltage is not in a preset voltage range, the voltage detection circuit is set to continuously detect the output voltage. When the output voltage is in the preset voltage range, the control circuit controls the output circuit to operate normally, to reduce the number of restart and avoid current shocking of the power amplifier after the power amplifier has short-circuit status.

DETAILED DESCRIPTION

Figure 1:
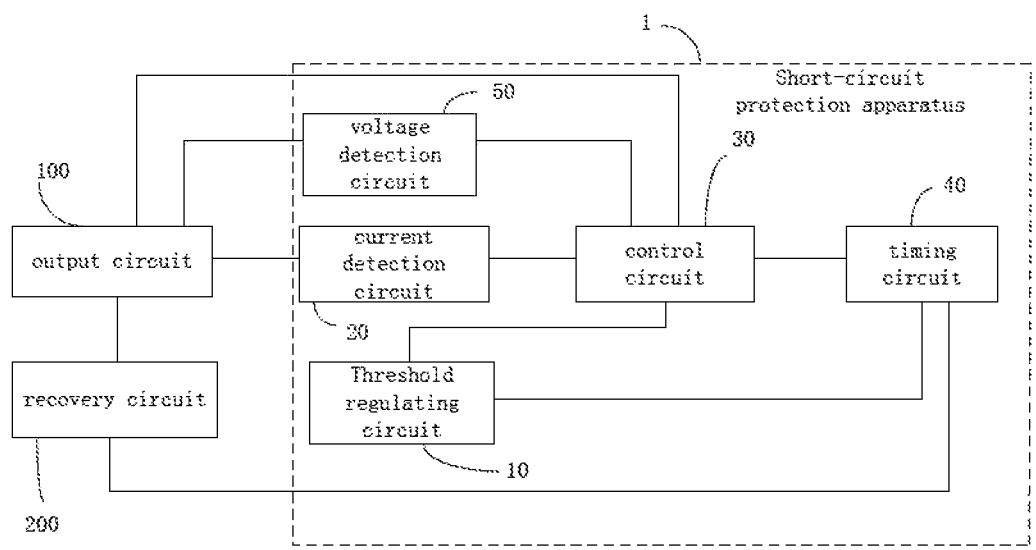
FIG. 1 is a block diagram of the short-circuit protection apparatus of the present disclosure.

Referring to FIG. 1, it show a block diagram of a short-circuit protection apparatus of the present disclosure. The short-circuit protection apparatus 1 may comprise a current detection circuit 20, a control circuit 30, a voltage detection circuit 50, a threshold regulating circuit 10, and a timing circuit 40.

The current detection circuit 20 may be connected to an output circuit 100 for detecting an output current of the output circuit 100 and outputting a current detection signal when the output current is greater than a preset current. At the same time, the output circuit 100 is in a short-circuit status, a second short-circuit protection symbol flag_short is set to high.

The control circuit 30 may be connected to the current detection circuit 20, to receive the current detection signal and control the output circuit 100 to be turned off according to the current detection signal.

The voltage detection circuit 50 may be connected to the output circuit 100 and the control circuit 30, to detect the output voltage of the output circuit 100. When the output voltage of the output circuit 100 is not in a preset voltage range (an output level symbol flag out is set to be in a logic-high state), the voltage detection circuit 50 detects the output voltage of the output circuit 100 continuously. When the output voltage of the output circuit 100 is in the preset voltage range (the output voltage symbol flag_out is set to be in a logic-low state), the voltage detection circuit 50 outputs a voltage detection signal to the control circuit 30 for controlling the output circuit 100.

In one embodiment, the preset voltage range is equal to or larger than a first voltage and equal to or less than a second voltage. The first voltage is a half of a supply voltage subtracting one. The second voltage is a half of the supply voltage adding one.

The threshold regulating circuit 10 may be connected to the control circuit 30, to output first and second threshold voltages to the control circuit 30 for controlling the output circuit 100.

The timing circuit 40 may be connected to the control circuit 30. When the output voltage is in the preset voltage range, the current detection circuit 20 detects an output current of the output circuit 100 and determines whether the output current is greater than a preset current.

When the output current is equal to or less than the preset current, the control circuit 30 controls the output circuit 100 to return to operate normally.

When the output current is greater than the preset current, the current detection circuit 20 outputs the current detection signal again to the control circuit 30.

The control circuit 30 outputs a first control signal according to the current detection signal.

When the control circuit 30 outputs a first control signal, the threshold regulating circuit 10 outputs a first threshold voltage for controlling the output circuit 100 to operate in a first voltage threshold mode. The timing circuit 40 starts first timekeeping.

When the control circuit 30 receives the current detection signal before the time of the first timekeeping reaches a first preset value, the timing circuit 40 restarts first timekeeping.

When the time of the first timekeeping of the timing circuit 40 reaches the first preset, the control circuit 30 outputs a second control signal to make the threshold regulating circuit 10 output a second threshold voltage, to control the output circuit 10 to operate in a second voltage threshold mode.

The first threshold voltage may be a low threshold operation voltage. The second threshold voltage may be a normal operation voltage. The first threshold voltage may be less than the second threshold voltage. The preset current value (low threshold preset current) of the output circuit 100 when operating in the first voltage threshold mode may be less than the preset current value (normal preset current) before entering the first voltage threshold mode.

Before the output circuit 100 enters the first voltage threshold mode: when the output current of the output circuit 100 detected by the current detection circuit 20 is equal to or less than the preset current, the output circuit 100 operates in the second voltage threshold mode. When the output current of the output circuit 100 detected by the current detection circuit 20 is greater than the preset current, the control circuit 30 controls the output circuit 100 to turned off After the control circuit 30 controls the output circuit 100 to turn off: a recovery circuit 200 controls the output circuit 100 to operate in the second voltage threshold mode, the timing circuit 40 starts a second timekeeping.

If the control circuit 30 does not receive the current detection signal before the time of the second timekeeping reaches the second preset value, the control circuit 30 controls the threshold regulating circuit 10 to output the second threshold voltage for controlling the output circuit 100 to operate in the second voltage threshold mode.

Before the time of the second timekeeping reaches the second preset time, if the control circuit 30 receives the current detection signal again, to control the output circuit 100 to switch between the second voltage threshold mode and off, and continue timekeeping;

When the time of the second timekeeping reaches the second preset time, the control circuit 30 controls the threshold regulating circuit 10 to output the first threshold voltage for controlling the output circuit 100 to operate in the first voltage threshold mode.

The threshold regulating circuit 10 includes a first power D1 and a second power D2. When the threshold regulating circuit 100 outputs the first threshold voltage, the first power D1 turns off, and the second power D2 operates. When the threshold regulating circuit 10 outputs the second threshold voltage, the first power D1 turns on, the first power D1 and the second power D2 operate.

In one embodiment, the output circuit 100 may be an audio power amplifier. The recovery circuit 200 may be a play source circuit. The first preset time may be 200 millisecond. The second preset time may be 800 microsecond.

When the output circuit 100 operates in the first voltage threshold mode, the control circuit 30 receives the current detection signal and a first short-circuit protection symbol flag WS_LT is set to be a logic-high state. When the output circuit 100 operates in the second voltage threshold mode, the control circuit 30 receives the current detection signal and the second short-circuit protection symbol flag_short is set to be in a logic-high state. When the output voltage detected by the voltage detection circuit is not at the preset voltage range, the control circuit 30 sets an output level symbol flag_out to high. When the output voltage detected by the voltage detection circuit is at the preset voltage range, the control circuit 30 sets the output level symbol flag_out to be in logic-low state after the control circuit 30 receives the voltage detection signal. The output level symbol flag_out, first and second short-circuit protection symbols flag WS_LT, flag_short can be stored in host computer (for example, single chip microcomputer), for controlling the output circuit 100 and indicating short-circuit statuses. Wherein the output circuit 100 touches the short-circuit protection apparatus in the second voltage threshold mode (that is, the normal work mode), the second short-circuit protection symbol flag_short is set to be in a logic-high state. The output circuit 100 touches the short-circuit protection apparatus in the first voltage threshold mode (that is, the low threshold mode), the first short-circuit protection symbol flag WS_LT is set to be in a logic-high state. The output voltage of the output circuit 100 detected by the voltage detection circuit 50 is not at the preset voltage range, the output level symbol flag_out is set to be in a logic-high state. The output voltage of the output circuit 100 detected by the voltage detection circuit 50 is at the preset voltage range, the output level symbol flag_out is set to be in a logic-low state. The output level symbol flag_out, the first and the second short-circuit protection symbol flag WS_LT and flag_short can be used by the host computer according to need. A power of the output circuit 100 can be controlled to shut off and the output circuit 100 can be controlled to turn off through software. The output level symbol flag_out, the first and second short-circuit protection symbols flag WS_LT and flag_short can be read from the host computer during check for deciding whether the output circuit 100 touches the short-circuit status and obtains short-circuit time (the short-circuit time is a time between two times short-circuit protection symbol).

Figure 2:
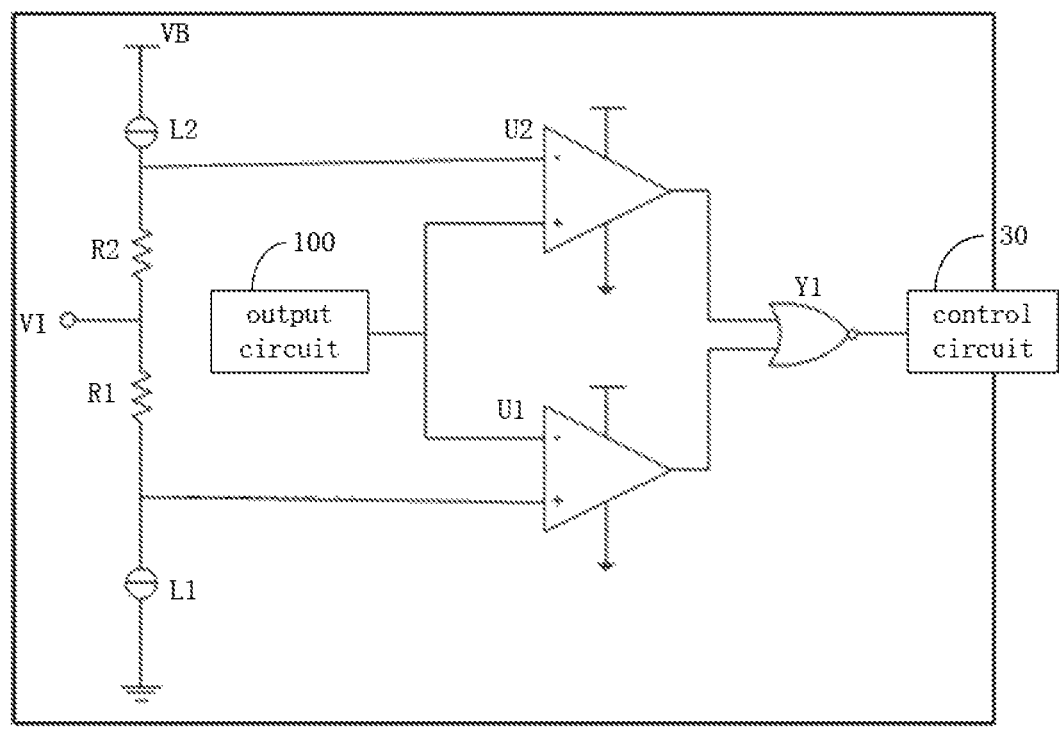
FIG. 2 is a schematic circuit of the voltage detection circuit of the short-circuit protection apparatus of the present disclosure.

Referring to FIG. 2, it show a schematic circuit of a voltage detection circuit of the short-circuit protection apparatus of the present disclosure. The voltage detection circuit 50 includes first and second current source L1 and L2, first and second resistors R and R2, first and second comparators U1 and U2, and NOR gate Y1. A non-inverting input terminal of the second comparator U2 is connected to an inverting input terminal of the first comparator U1, and then connected to the output circuit 100. An inverting input terminal of the second comparator U2 is connected to a power source VB through the second current source L2 and connected to a voltage input terminal VI through the second resistor R2. A non-inverting input terminal of the first comparator U1 is grounded through the first current source L1 and connected to the voltage input terminal VI through the first resistor R1. An output terminal of the second comparator U2 is connected to a first input terminal of the NOR gate Y1. An output terminal of the first comparator U1 is connected to a second input terminal of the NOR gate Y1. An output terminal of the NOR gate Y1 is as the output terminal of the voltage detection circuit 50, which is connected to the control circuit 30.

The current of the first current source L1 is the same as the current of the second current source L2. A first voltage is preset in the first comparator U1. A second voltage is preset in the second comparator U2.

When the output circuit 100 has a short-circuit status, if the output voltage of the output circuit 100 detected by the voltage detection circuit 50 is not at the preset voltage range, that is, the first comparator U1 receives a voltage from the output circuit 100 is less than the first voltage (that is, the output voltage of the output circuit 100 is less than the first voltage), the first comparator U1 outputs a high level signal. Due to the first voltage is less than the second voltage, the second comparator U2 receives a voltage from the output circuit 100 is also less than the second voltage, the second comparator U2 outputs a low level signal. The NOR gate Y1 outputs a low level signal to the control circuit 30 for controlling the control circuit 30 to not operate. The voltage detection circuit 50 continuously detects the output voltage. Or the second comparator U2 receives a voltage from the output circuit 100 is greater than the second voltage (that is, the output voltage of the output circuit 100 is greater than the second voltage), the second comparator U2 outputs a high level signal. Due to the second voltage is greater than the first voltage, the first comparator U1 receives a voltage from the output circuit 100 is also greater than the first voltage; the first comparator U1 outputs a low level signal. The NOR gate Y1 outputs a low level signal to the control circuit 30 for controlling the control circuit 30 to not operate. The voltage detection circuit 50 continuously detects the output voltage.

If the output voltage of the output circuit 100 detected by the voltage detection circuit 50 is at the preset voltage range, that is, the first comparator U1 receives a voltage from the output circuit 100 is greater than the first voltage, the first comparator U1 outputs a low level signal, and the second comparator U2 receives a voltage from the output circuit 100 is less than the second voltage, the second comparator U2 outputs a low level signal. The voltage detection signal (e. g. a high level signal) is output to the control circuit 30 through the NOR gate Y1 for controlling the output circuit 100.

Figure 3:
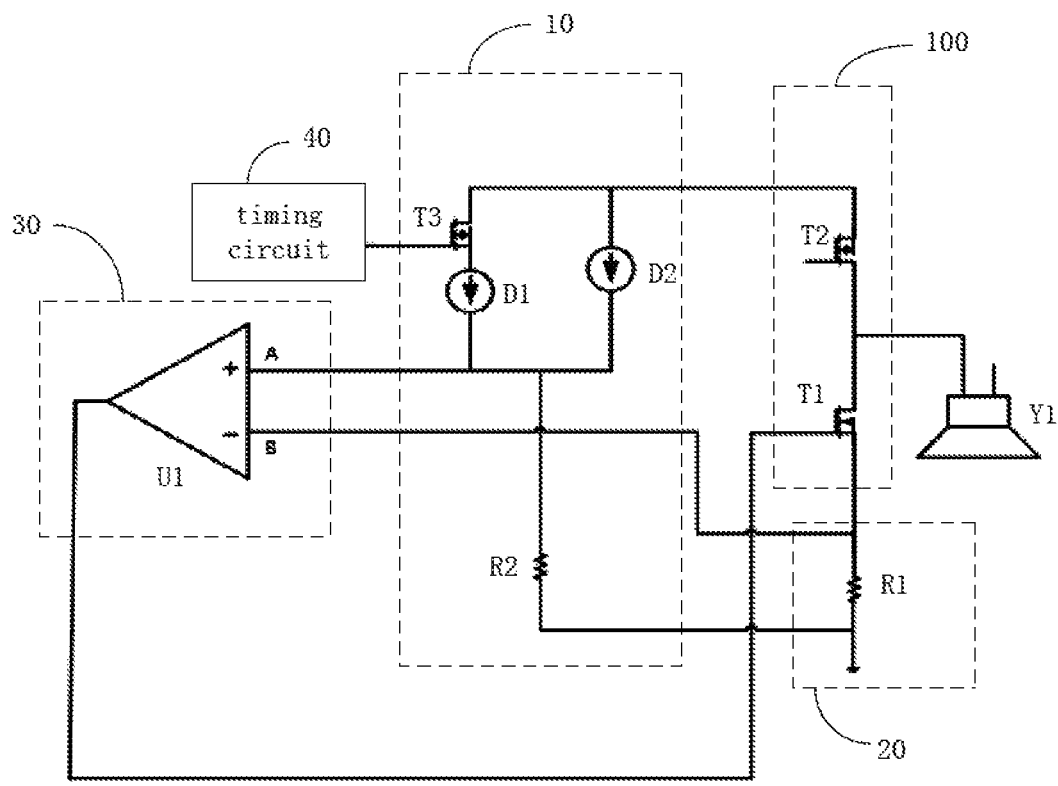
FIG. 3 is a schematic circuit of the short-circuit protection apparatus of the present disclosure.

Referring to FIG. 3, it show a schematic circuit of a short-circuit protection apparatus of the present disclosure. The output circuit 100 includes a first transistor T1 and a second transistor T2. The current detection circuit 20 includes first resistor R1. The control circuit 30 includes a comparator U1. The threshold regulating circuit 10 includes the first power D1, the second power D2, a controllable switch T3, and a second resistor R2. A drain of the first transistor T1 is connected to a drain of the second transistor T2, and then is connected to a speaker Y1. A source of the first transistor T1 is grounded through the first resistor R1. The source of the first transistor T1 is connected to an inverting input terminal of the comparator U1. A gate of the first transistor T1 is connected to an output terminal of the comparator U1. A non-inverting input terminal of the comparator U1 is connected to a source of the second transistor T2 through the second power D2. A gate of the second transistor T2 is connected to the short-circuit protection apparatus 1. The non-inverting input terminal of the comparator U1 is connected to a first terminal of the controllable switch T3 through the first power D1. A control terminal of the controllable switch T3 is connected to the timing circuit 40. A second terminal of the controllable switch T3 is connected to the first power D1 and the source of the second transistor T2. The non-inverting input terminal of the comparator U1 is grounded through the second resistor R2.

In one embodiment, the first transistor T1 may be an N-type field effect transistor. The second transistor T2 may be a P-type field effect transistor. The controllable switch T3 may be a P-type field effect transistor (FET). The control terminal, the first terminal, and the second terminal of the controllable switch T3 are corresponding to a gate, a drain, and a source of the P-type FET.

In one embodiment, the short-circuit protection apparatus is a part of circuit connected to one terminal of the speaker Y1, and other parts of circuit connected to another terminal of the speaker Y1 is not he shown. Wherein the first and second transistors T1 and T2 are consist of an output of the power amplifier, for driving the speaker Y1 through Pushing or inhaling high current. The short-circuit protection apparatus of the first transistor T1 is shown in the FIG. 2, and the short-circuit protection apparatus of the second transistor T2 is not shown in the FIG. 2.

The first resistor R1 is a current detection resistor of the first transistor T1, for converting current of the first transistor T1 to voltage. The comparator U1 is an over-current protection comparator, a voltage of the non-inverting input terminal of the comparator U1 is equal to a voltage of the second resistor R2 provided by the second power D2. A voltage of the inverting input terminal of the comparator U1 is equal to a voltage of the first resistor R1.

When the first transistor T1 operates normally (that is, a current through the first resistor R1 is less than a normal preset current), the timing circuit 40 outputs a low level signal to control the controllable switch T3 to be turned on. The first power D1 is turned on. A current through the second resistor R2 is a sum of current of the first power D1 and the second power D2. The voltage of the non-inverting input terminal of the comparator U1 is greater than the voltage of the inverting input terminal of the comparator U1. The comparator U1 outputs a high level signal to control the first transistor T1 to be turned on. The first transistor T1 operates normally. When a larger current through the first resistor R1 (that is, a current through the first resistor R1 is greater than a normal preset current), the current detection circuit 20 outputs a current detection signal to the control circuit 30. The voltage of the inverting input terminal of the comparator U1 is greater than the voltage of the non-inverting input terminal of the comparator U1. The comparator U1 outputs a low level signal to control the first transistor T1 to be turned off. There is not current flow the first transistor T1. At the same time, the timing circuit 40 starts the second timekeeping, and the time of the second timekeeping is accumulated in microseconds. When the first transistor T1 is turned of for a certain time(for example, 250 microsecond), and the certain time is less than the second preset time (for example, 800 microsecond), the timing circuit 40 outputs a first timing signal to the recovery circuit 200, for controlling the first transistor T1 to be turned on again. The first transistor T1 operates normally. When a current through the first resistor R1 is reduced (for example, the current through the first resistor R1 is less than the normal preset current), the first transistor T1 is at an instantaneous short-circuit status. The recovery circuit 200 controls the first transistor T1 to be turned on for recovering normal operation. If the current through the first resistor R1 remains high (for example, the current through the first resistor R1 is greater than the normal preset current), the comparator U1 outputs a low level signal to control the first transistor T1 to be turned off again. There is not current through the first transistor T1. Thus, the first transistor T1 is turned on or turned off alternately (that is, the first transistor T1 is at persistent short-circuit status). When the time of the second timekeeping of the timing circuit 40 reaches the second preset time (for example, 800 microsecond), the timing circuit 40 outputs second timing signal (for example, a high level signal) to control the controllable switch T3 to be turned off. The threshold regulating circuit 10 outputs the first threshold, voltage (that is, the output voltage of the second power D2), the first power D1 is turned off. The first transistor T1 operates in low threshold mode. At the same time, the timing circuit 40 starts the first timekeeping, the time of the first timekeeping is accumulated in milliseconds.

When the first transistor T1 operates in low threshold mode (that is, an output voltage of the second power D2), the first power D1 is turned off. The current through the second resistor R2 is reduced. The voltage of the non-inverting input terminal of the comparator U1 is reduced accordingly. But the voltage of the non-inverting input terminal of the comparator U1 remains greater than the voltage of the inverting input terminal. Therefore, the comparator U1 outputs a high level signal to the first transistor T1 for controlling the first transistor T1 to be turned on. Because the first transistor T1 operates in low threshold mode, the current through the first transistor T1 is at a safe range, no impact on safety, life, and reliability of the first transistor T1. When the current through the first resistor R1 is higher (for example, the current through the first resistor R1 is greater than the low threshold preset current), the voltage of the inverting input terminal of the comparator U1 is greater than the voltage of the non-inverting input terminal of the comparator U1. The comparator U1 outputs a first control signal (for example, a low level signal) to control the first transistor T1 to be turned off. There is not current through the first transistor T1. When the first transistor T1 is turned off for a certain time (for example, 250 microsecond), the recovery circuit 200 controls the first transistor T1 to be turned on again. The first transistor T1 operates normally. If the current through the first resistor R1 remains high (for example, the current through the first resistor R1 is greater than the law threshold preset current), the comparator U1 outputs a low level signal to control the first transistor T1 to be turned off. There is no current through the first transistor T1. Thus, the first transistor T1 is turned on or off alternately in the low threshold mode (the higher current does not impact on the first transistor T1 in the low threshold mode). When the control circuit 30 receives the current detection signal in the second preset time (that is, the output current of the output circuit 10 detected by the current detection circuit 20 is greater than the low threshold preset current), the control circuit 30 controls the timing circuit 40 to restart second timing, and thereby continuously cycling until the second timing time reaches the second preset time. The control circuit 30 does not receive the current detection signal in the second preset time (that is, the output current of the output circuit 10 detected by the current detection circuit 20 is equal to or less than the low threshold preset current), the timing circuit 40 outputs a third timing signal (for example, a low level signal) to control the controllable switch T3 to be turned on. The threshold regulating circuit 10 receives the second control signal and outputs the second threshold voltage (that is, a sum of the output voltage of the first power D1 and the output voltage of the second power D2). The current through the second resistor R2 is a sum of the current of the first power D1 and the current of the second power D2. The voltage of the non-inverting input terminal of the comparator U1 is greater than the voltage of the inverting input terminal of the comparator U1. The comparator U1 outputs a high level signal to control the first transistor T1 to be turned on. The first transistor T1 operates normally, therefore, the first transistor T1 recovers operation normally (that is, the first transistor T1 operates in the second voltage threshold mode). The principle of the second transistor T2 is the same as the principle of the first transistor T1.

After the first transistor T1 return s to normal operation, because there is no short-circuit status at this time, the first and second transistors T1 and T2 return to normal operation mode is safe and can continue to play music. In one common case, the output wires of the positive and negative terminals of the on-hoard power amplifier are mistakenly connected together, and the power amplifier will be permanently in an output terminal short-circuit status. In the present invention, because the power amplifier will always circulate in a low threshold mode after a continuous short-circuit status, and the safety of the power amplifier can be guaranteed and the incorrect connection can be checked while waiting for maintenance. In this case, if the traditional circulating protection apparatus is adopted, the power amplifier under the continuous high current impact may cause protection failure, which may lead to the power amplifier short-circuit burning, and in serious case, the whole vehicle may catch fire.

Figure 4:
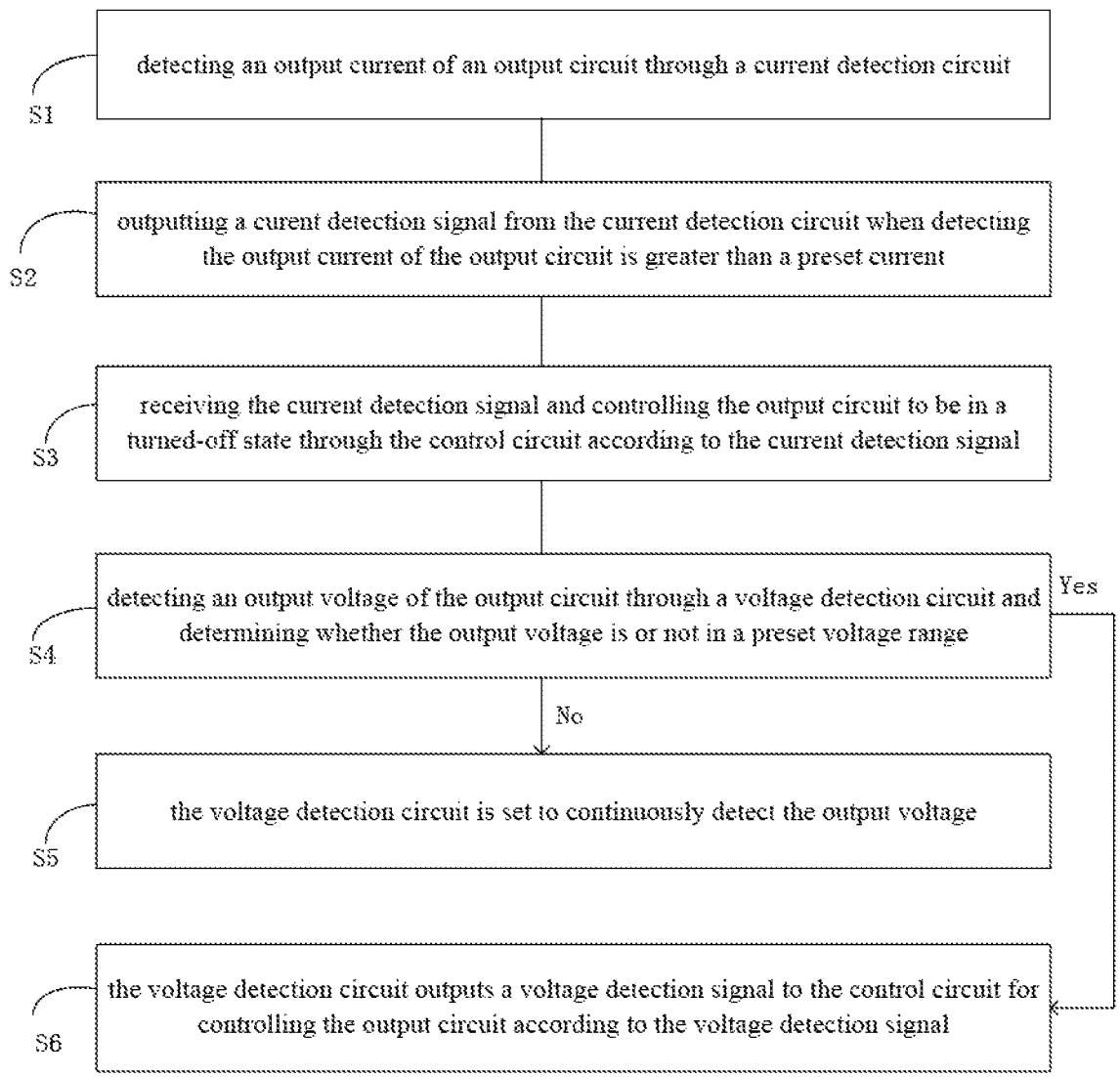
FIG. 4 is a flow chart of the short-circuit protection method of the present disclosure.

Referring to FIG. 4, it show a flow chart of a short-circuit protection method of the present disclosure. The short-circuit protection method include the following blocks:

Block S1: detecting an output current of an output circuit through a current detection circuit, wherein the current detection circuit is connected to the input circuit.

Block S2: outputting a current detection signal from the current detection circuit when detecting the output current of the output circuit is greater than a preset current.

Block S3: receiving the curent detection signal and controlling the output circuit to be in a turned-off state through the control circuit according to the current detection signal, wherein the control circuit is connected to the current detection circuit.

Block S4: detecting an output voltage of the output circuit through a voltage detection circuit and determining whether the output voltage is or not in the preset voltage range, wherein the voltage detection circuit is connected to the output circuit and the control circuit.

Block 85: when the output voltage is not in a preset voltage range, the voltage detection circuit is set to continuously detect the output voltage.

Block S6: when the output voltage is in the preset voltage range, the voltage detection circuit outputs a voltage detection signal to the control circuit for controlling the output circuit according to the voltage detection signal.

The short-circuit protection method further include: outputting a first threshold voltage or a second threshold voltage through a threshold regulating circuit to the control circuit for controlling the output circuit, wherein the threshold regulating circuit is connected to the control circuit.

Starting a timekeeping through a timing circuit, wherein the timing circuit is connected to the control circuit.

Determining the output voltage is in the preset voltage range, and detecting whether the output current of the output circuit through the current detection circuit is greater than the preset current.

When the output current is equal to or less than the preset current, the control circuit controls the output circuit to return to operate normally.

When the output current is greater than the preset current, the current detection circuit outputs the current detection signal to the control circuit again.

Outputting a first control signal through the control circuit according to the current detection signal outputted from the current detection circuit again.

Outputting the first control signal through the control circuit, and outputting the first threshold voltage through the threshold regulating circuit for controlling the output circuit to operate in a first voltage threshold mode, and starting a first timekeeping through the timing circuit.

When the control circuit receives the current detection signal before the time of the first timekeeping reaches a first preset time, the timing circuit restarts the first timekeeping.

When the time of the first timekeeping of the timing circuit reaches the first preset value, the control circuit outputs the second control signal for controlling the threshold regulating circuit to output the second threshold voltage to control the output circuit to operate in a second voltage threshold mode.

When the first threshold voltage is less than the second threshold voltage, the preset current value of the output circuit when operating in the first voltage threshold mode is less than the preset current value before entering the first voltage threshold mode.

Before the output circuit enters in the first voltage threshold mode, further includes: wherein when the output current of the output circuit detected through the current detection circuit is equal to or less than the preset current value, the output circuit operates in the second voltage threshold mode.

When the output current of the output circuit detected by the current detection circuit is greater than the preset current value, the control circuit controls the output circuit to be in the turned-off state.

After the control circuit controls the output circuit to be in the turned-off state, further includes: controlling the output circuit to operate in the second voltage threshold mode through the recovery circuit, and starting a second timekeeping through the timing circuit.

Doing not receive the current detection signal before the time of the second timekeeping reaches the second preset time through the control circuit, controlling the threshold regulating circuit through the control circuit to output the second threshold voltage for controlling the output circuit to operate in the second voltage threshold mode.

Receiving the current detection signal again through the control circuit before the time of the second timekeeping reaches the second preset time, controlling the output circuit through the control circuit to switch between the second voltage threshold mode and the turned-off state, and continuing the second timekeeping through the timing circuit;

When the time of the second timekeeping reaches the second preset time, the control circuit controls the threshold regulating circuit to output the first threshold voltage for controlling the output circuit to operate in the first voltage threshold mode.

The short-circuit protection apparatus and method detects the output current of the output circuit through the current detection circuit, and controls the output circuit to be turned off when the output current is greater than the preset current The output voltage of the output circuit detected by the voltage detection circuit. When the output voltage is not at the preset voltage range, the output voltage can be detected continuously. When the output voltage is at the preset voltage range, the output circuit can be controlled to operate normally through the control circuit, to reduce the number of restart and avoid current shocking the power amplifier after the power amplifier has short-circuit status.

The foregoing merely embodiments of the present disclosure, and is not intended to limit the scope of the disclosure.

Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A short-circuit protection apparatus, comprising;
a current detection circuit connected to an output circuit to detect an output current of the output circuit and output a current detection signal when the output current is greater than a preset current;
a control circuit, connected to the current detection circuit to receive the current detection signal and control the output circuit to be in a turned-off state according to the current detection signal;
a voltage detection circuit, connected to the output circuit and the control circuit to detect an output voltage of the output circuit, wherein when the output voltage is not in a preset voltage range, the voltage detection circuit is set to continuously detect the output voltage; and when the output voltage is in the preset voltage range, the voltage detection circuit outputs a voltage detection signal to the control circuit for controlling the output circuit according to the voltage detection signal.

2. The short-circuit protection apparatus of claim 1, wherein the preset voltage range is equal to or greater than a first voltage and equal to or less than a second voltage, the first voltage is equal to a result of a half of a supply voltage subtracting one, the second voltage is equal to a result of a half of the supply voltage adding one.

3. The short-circuit protection apparatus of claim 2, wherein the voltage detection circuit comprises a first current source, a second current source, a first resistor, a second resistor, a first comparator, a second comparator, and a NOR gate, a non-inverting input terminal of the second comparator is connected to an inverting input terminal of the first comparator, and connected to the output circuit, an inverting input terminal of the second comparator is connected to the supply voltage through the second current source and connected to a voltage input terminal through the second resistor, a non-inverting input terminal of the first comparator is grounded through the first current source and connected to the voltage input terminal through the first resistor, an output terminal of the second comparator is connected to a tint input terminal of the NOR gate, an output terminal of the first comparator is connected to a second input terminal of the NO gate, and an output terminal of the NOR gate is as the output terminal of the voltage detection circuit.

4. The short-circuit protection apparatus of claim 1, further comprising:
a threshold regulating circuit, connected to the control circuit to output a first threshold voltage or a second threshold voltage to the control circuit for controlling the output circuit; and
a timing circuit, connected to the control circuit;
wherein when determining the output voltage is in the preset voltage range, the current detection circuit detects whether the output current of the output circuit is greater than the preset current;
when the output current is equal to or less than the preset current, the control circuit controls the output circuit to return to operate normally;
when the output current is greater than the preset current, the current detection circuit outputs the current detection signal to the control circuit again;

the control circuit outputs a first control signal according to the current detection signal outputted from the current detection circuit again;
when the control circuit outputs the first control signal, the threshold regulating circuit outputs the first threshold voltage for controlling the output circuit to operate in a first voltage threshold mode, the timing circuit starts a first timekeeping;
when the control circuit receives the current detection signal before the time of the first timekeeping reaches a first preset time, the timing circuit restarts the first timekeeping;
when the time of the first timekeeping of the timing circuit reaches the first preset value, the control circuit outputs the second control signal for controlling the threshold regulating circuit to output the second threshold voltage to control the output circuit to operate in a second voltage threshold mode;
wherein the first threshold voltage is less than the second threshold voltage, the preset current value of the output circuit when operating in the first voltage threshold mode is less than the preset current value before entering the first voltage threshold mode.

5. The short-circuit protection apparatus of claim 4, wherein before the output circuit enters in the first voltage threshold mode:
when the output current of the output circuit detected by the current detection circuit is equal to or less than the preset current value, the output circuit operates in the second voltage threshold mode;
when the output current of the output circuit detected by the current detection circuit is greater than the preset current value, the control circuit controls the output circuit to be in the turned-off state.

6. The short-circuit protection apparatus of claim 5, wherein after the control circuit controls the output circuit to be in the turned-off state,
the output circuit is controlled to operate in the second voltage threshold mode by the recovery circuit, and the timing circuit starts a second timekeeping;
when the control circuit does not receive the current detection signal before the time of the second timekeeping reaches the second preset time, the control circuit controls the threshold regulating circuit to output the second threshold voltage for controlling the output circuit to operate in the second voltage threshold mode;
when the control circuit receives the current detection signal again before the time of the second timekeeping reaches the second preset time, the control circuit controls the output circuit to switch between the second voltage threshold mode and the turned-off state, and the timing circuit continues the second timekeeping;
when the time of the second timekeeping reaches the second preset time, the control circuit controls the threshold regulating circuit to output the first threshold voltage for controlling the output circuit to operate in the first voltage threshold mode.

7. The short-circuit protection apparatus of claim 4, wherein the threshold regulating circuit comprises a first power and a second power, when the threshold regulating circuit outputs the first threshold voltage, the first power is turned off while the second power operates; when the threshold regulating circuit outputs the second threshold voltage, the first power and the second power both operate.

8. The short-circuit protection apparatus of claim 4, wherein when the output circuit operates in the first voltage threshold mode, a first short-circuit protection symbol is set to be in a logic-high state after the control circuit receives the current detection signal; when the output circuit operates in the second voltage threshold mode, a second short-circuit protection symbol is set to be in the logic-high state after the control circuit receives the current detection signal; when the output voltage detected by the voltage detection circuit is not at the preset voltage range, the control circuit sets an output level symbol to be in the logic-high state; when the output voltage detected by the voltage detection circuit is at the preset voltage range, the output level symbol is set to be in a logic-low state after the control circuit receives the voltage detection signal, the output level symbol, the first and the second short-circuit protection symbols are stored in a host computer, to control the output circuit and indicate short-circuit status.

9. The short-circuit protection apparatus of claim 4, wherein the output circuit comprises first and second transistors, the current detection circuit comprises a first resistor, the control circuit comprises a comparator, the threshold regulating circuit comprises a first power, a second power, a controllable switch, and a second resistor, a drain of the first transistor is connected to a drain of the second transistor, and then connected to a speaker, a source of the first transistor is grounded through the first resistor, the source of the first transistor is connected to an inverting input terminal of the comparator, a gate of the first transistor is connected to an output terminal of the comparator, a non-inverting input terminal of the comparator is connected to a source of the second transistor through the second power, a gate of the second transistor is connected to the short-circuit protection apparatus, the non-inverting input terminal of the comparator is connected to a first terminal of the controllable switch through the first power, a control terminal of the controllable switch is connected to the timing circuit, a second terminal of the control circuit is connected to the first power and the source of the second transistor, the non-inverting input terminal of the comparator is grounded through the second resistor.

10. The short-circuit protection apparatus of claim 9, wherein the first transistor is an N-type field effect transistor, the second transistor is a P-type field effect transistor, the controllable switch is a P-type field effect transistor, the control terminal, the first terminal, and the second terminal of the controllable switch are corresponding to a gate, a drain, and a source of the P-type field effect transistor.

11. A short-circuit protection method, comprising:
detecting an output current of an output circuit through a current detection circuit, wherein the current detection circuit is connected to the output circuit;
outputting a current detection signal from the current detection circuit when detecting the output current of the output circuit is greater than a preset current;
receiving the current detection signal and controlling the output circuit to be in a turned-off state through a control circuit according to the current detection signal, wherein the control circuit is connected to the current detection circuit; and
detecting an output voltage of the output circuit and determining whether the output voltage is or not in a preset voltage range through a voltage detection circuit, wherein the voltage detection circuit is connected to the output circuit and the control circuit, when the output voltage is not in a preset voltage range, the voltage detection circuit is set to continuously detect the output voltage; and when the output voltage is in the preset voltage range, the voltage detection circuit outputs a voltage detection signal to the control circuit for controlling the output circuit according to the voltage detection signal.

12. The short-circuit protection method of claim 11, further comprising:
outputting a first threshold voltage or a second threshold voltage through a threshold regulating circuit to the control circuit for controlling the output circuit, wherein the threshold regulating circuit is connected to the control circuit;
starting a timekeeping through a timing circuit, wherein the timing circuit is connected to the control circuit;
determining the output voltage is in the preset voltage range, and detecting whether the output current of the output circuit through the current detection circuit is greater than the preset current;
wherein when the output current is equal to or less than the preset current, the control circuit controls the output circuit to return to operate normally;
wherein when the output current is greater than the preset current, the current detection circuit outputs the current detection signal to the control circuit again;
outputting a first control signal through the control circuit according to the current detection signal outputted from the current detection circuit again;
outputting the first control signal through the control circuit, and outputting the first threshold voltage through the threshold regulating circuit for controlling the output circuit to operate in a first voltage threshold mode, and starting a first timekeeping through the timing circuit;
wherein when the control circuit receives the current detection signal before the time of the first timekeeping reaches a first preset time, the timing circuit restarts the first timekeeping;
wherein when the time of the first timekeeping of the timing circuit reaches the first preset value, the control circuit outputs the second control signal for controlling the threshold regulating circuit to output the second threshold voltage to control the output circuit to operate in a second voltage threshold mode;
wherein the first threshold voltage is less than the second threshold voltage, the preset current value of the output circuit when operating in the first voltage threshold mode is less than the preset current value before entering the first voltage threshold mode.

13. The short-circuit protection method of claim 12, wherein before the output circuit enters in the first voltage threshold mode, further comprises:
wherein when the output current of the output circuit detected through the current detection circuit is equal to or less than the preset current value, the output circuit operates in the second voltage threshold mode;
wherein when the output current of the output circuit detected by the current detection circuit is greater than the preset current value, the control circuit controls the output circuit to be in the turned-off state.

14. The short-circuit protection method of claim 13, wherein after the control circuit controls the output circuit to be in the turned-off state, further comprises:
controlling the output circuit to operate in the second voltage threshold mode through the recovery circuit, and starting a second timekeeping through the timing circuit;
doing not receive the current detection signal before the time of the second timekeeping reaches the second preset time through the control circuit, controlling the threshold regulating circuit through the control circuit to output the second threshold voltage for controlling the output circuit to operate in the second voltage threshold mode;

receiving the current detection signal again through the control circuit before the time of the second timekeeping reaches the second preset time, controlling the output circuit through the control circuit to switch between the second voltage threshold mode and the turned-off state, and continuing the second timekeeping through the timing circuit;

wherein when the time of the second timekeeping reaches the second preset time, the control circuit controls the threshold regulating circuit to output the first threshold voltage for controlling the output circuit to operate in the first voltage threshold mode.

\* \* \* \* \*